United States Patent [19]

Mason et al.

[11] 3,998,939

[45] Dec. 21, 1976

[54] PRODUCTION OF BETA-LITHIUM ALUMINATE ($LiAlO_2$)

[75] Inventors: David M. Mason, Chicago; Cornelius J. VanDrunen, South Holland, both of Ill.

[73] Assignee: Institute of Gas Technology, Chicago, Ill.

[22] Filed: Aug. 20, 1975

[21] Appl. No.: 606,060

[52] U.S. Cl. .................................. 423/600; 429/30
[51] Int. Cl.[2] .......................................... C01F 7/04
[58] Field of Search .................................... 423/600

[56] References Cited

UNITED STATES PATENTS

| | | |
|---|---|---|
| 3,795,723 | 3/1974 | Clendenen et al. ............. 423/600 |
| 3,859,427 | 1/1975 | Francis et al. .................... 423/600 |
| 3,878,296 | 4/1975 | Vine et al. ........................ 423/600 |

OTHER PUBLICATIONS

Nishikawa et al., "Chemical Abstracts," vol. 81, 1974, 71944m.
Chang et al., "Journal of American Chemical Soc.," vol. 90, Apr. 1968, pp. 2020–2022.
Stewner et al., "Z. fur Anorganische und Allgemeine Chemie," vol. 381, 1971, pp. 149–160.

*Primary Examiner*—Herbert T. Carter
*Attorney, Agent, or Firm*—Thomas W. Speckman

[57] ABSTRACT

A low pressure process for the production of beta-lithium aluminate ($LiAlO_2$) in a two thermal stage reaction of alumina with liquid phase lithium carbonate comprising admixing powdered alumina with a carbonates composition selected from the group consisting of a ternary lithium-potassium-sodium carbonates composition, a binary lithium-potassium carbonates composition and a binary lithium-sodium carbonates composition, heating the admixture at about 480° to 550° C. in a first thermal stage for a period of time to react the alumina with lithium carbonate to form lithium aluminate, and raising the temperature of the lithium aluminate to about 600° to 650° C. in a second thermal stage for a period of time to transform the lithium aluminate ($LiAlO_2$) to the desired beta-lithium aluminate.

14 Claims, 5 Drawing Figures

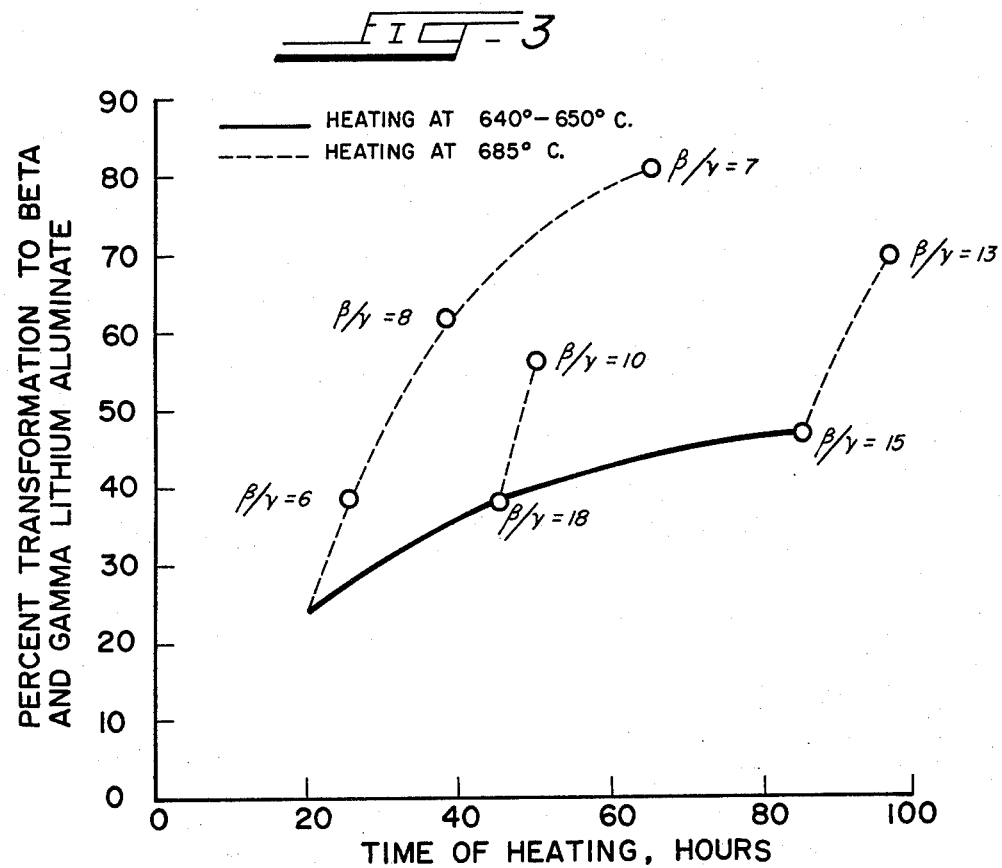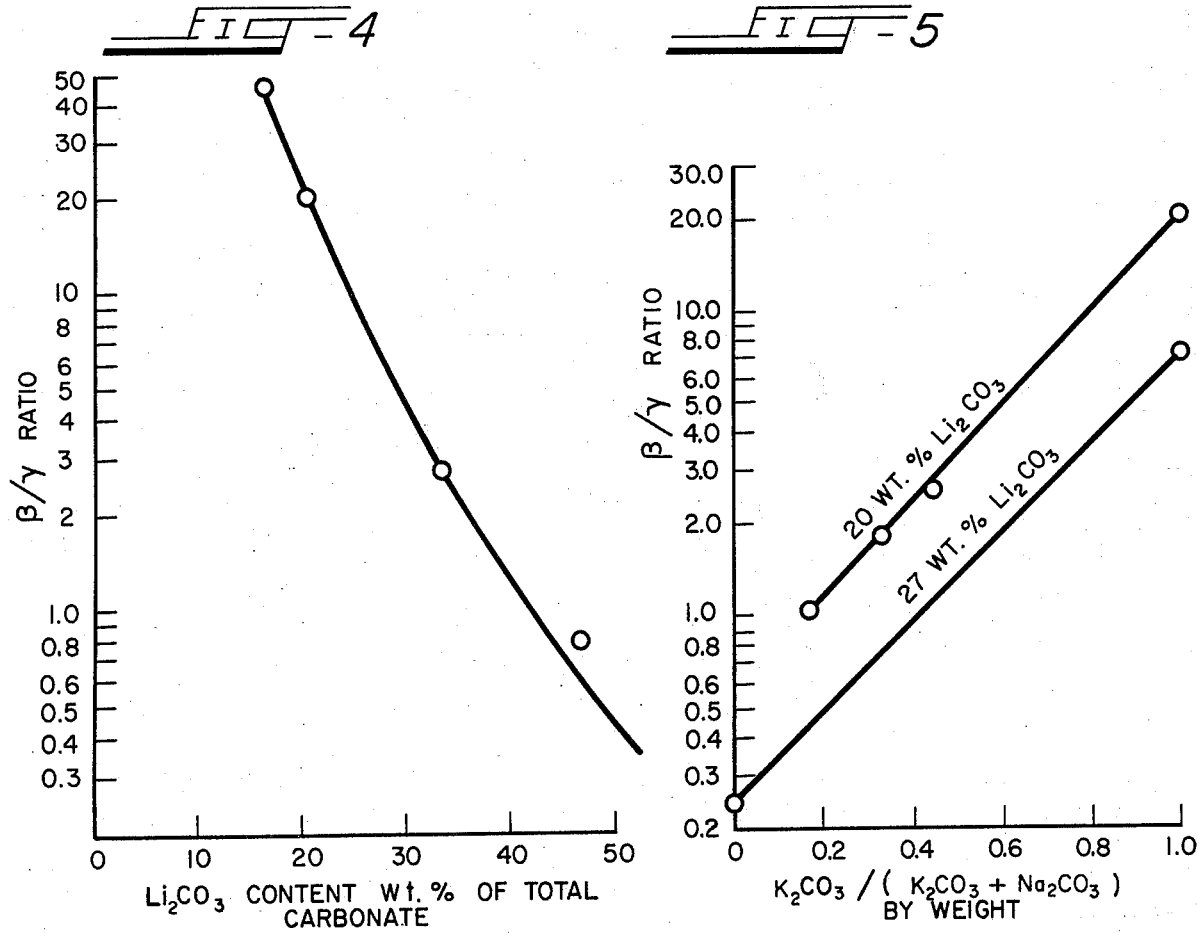

PRODUCTION OF BETA-LITHIUM ALUMINATE (LiAlO$_2$)

Lithium aluminate has been produced in the alpha and the gamma crystalline forms. The beta-lithium aluminate form has been previously identified but the only previously known methods of production of the beta form of lithium aluminate (LiAlO$_2$) has been at very high pressures of 18 kilobars (261,072 psi) by reaction of lithium peroxide and aluminum oxide at a temperature of 370° C. and by reaction of a 2:1 molar mixture of lithium peroxide with aluminum nitride at 22 kilobars (319,088 psi) at 550° C. [See Journal of the American Chemical Society 90:8, Pages 2020–2022, Apr. 10, 1968, High-Pressure — High Temperature Syntheses. III. Direct Syntheses of New High-Pressure Forms of LiAlO$_2$ and LiGaO$_2$ and Polymorphism in LiMO$_2$ Compounds (M=B, Al, Ga), C. H. Chang and J. L. Margrave] The beta-lithium aluminate (LiAlO$_2$) lattice parameters as shown by the Chang and Margrave article are: $a = 8.147$ A, $b = 7.941$ A, $c = 6.303$ A, $\beta = 93.18°$. As pointed out by the Chang and Margrave article, the polymorphs of lithium aluminate include three forms or crystalline phases of lithium aluminate (LiAlO$_2$). Two of these are well known in the literature: one of them is tetragonal with all cations having a coordination number of 4 and is obtained at temperatures at above about 800° C.; the second is hexagonal with all cations having a coordination number of 6 and can be obtained at atmospheric pressure only at temperatures below about 600° C. but can also be obtained at higher temperatures by use of pressures such as 35 kilobars. These forms are mislabeled in the Chang and Margrave paper. We followed the other literature in identifying the first form as gamma and the second as alpha. The third form, beta, is prepared at intermediate pressures and temperatures with the aluminum cations exhibiting both coordination numbers 4 and 6. The X-Ray powder diffraction patterns of alpha and gamma lithium aluminate forms are known to the art. The X-Ray powder diffraction pattern for beta-lithium aluminate (LiAlO$_2$) is set forth in the Chang and Margrave article as follows:

| d,A | Relative Intensity |
| --- | --- |
| 4.05 | strong |
| 3.87 | strong |
| 3.12 | weak |
| 2.706 | strong |
| 2.639 | medium |
| 2.452 | strong |
| 2.368 | weak |
| 2.178 | very very weak |
| 2.096 | very weak |
| 1.8183 | weak |
| 1.7979 | very weak |
| 1.6040 | very weak |
| 1.5762 | weak |
| 1.5385 | medium |
| 1.4019 | weak |
| 1.3905 | very weak |
| 1.3029 | weak |

The above powder X-Ray diffraction pattern is our criterion for identification of beta-lithium aluminate.

The terminology beta-lithium aluminate as used in this specification and claims refers to the form beta-lithium aluminate (LiAlO$_2$). The beta form of lithium aluminate has been found particularly useful for use as matrices for liquid carbonate fuel cells. Such matrices are favorably stable and resistant to cracking and distortion under temperatures of operation of fuel cells while requiring less volume than prior matrices.

This invention relates to a method for the production of beta-lithium aluminate by the reaction of aluminum oxide and lithium carbonate in a binary lithium-potassium or lithium-sodium carbonate composition and in a ternary lithium-potassium-sodium carbonate composition. When the reaction is carried out under the conditions set forth in more complete detail below, we have found that the beta form of lithium aluminate as defined by the powder X-Ray diffraction pattern set forth above, can be produced at low pressures, from ambient to a few hundred pounds per square inch.

It is an object of this invention to provide a process for the production of beta-lithium aluminate at pressures of less than a few hundred pounds per square inch.

It is another object of this invention to provide a process for the production of beta-lithium aluminate by the reaction of lithium carbonate in either a binary or ternary mixture of potassium and/or sodium carbonates with aluminum oxide which does not require specialized high pressure equipment.

It is yet another object of this invention to provide a low pressure process by which the maximization of yield of beta crystalline form of lithium aluminate may be obtained as compared with alpha and gamma crystalline forms of lithium aluminate.

Further objects of this invention will appear to one skilled in the art as this description proceeds and by reference to the figures wherein:

FIG. 3 is a graph showing the rate of transformation to beta and gamma forms of lithium aluminate obtained under differing heating schedules;

FIG. 4 is a graph showing the effect of lithium concentration of a lithium-potassium binary carbonate composition upon the beta to gamma ratio; and FIG. 5 shows the effect of the sodium to potassium carbonate ratio in the lithium-sodium-potassium carbonate ternary used as a reactant upon the beta to gamma ratio of resulting lithium aluminate.

Figure 1:
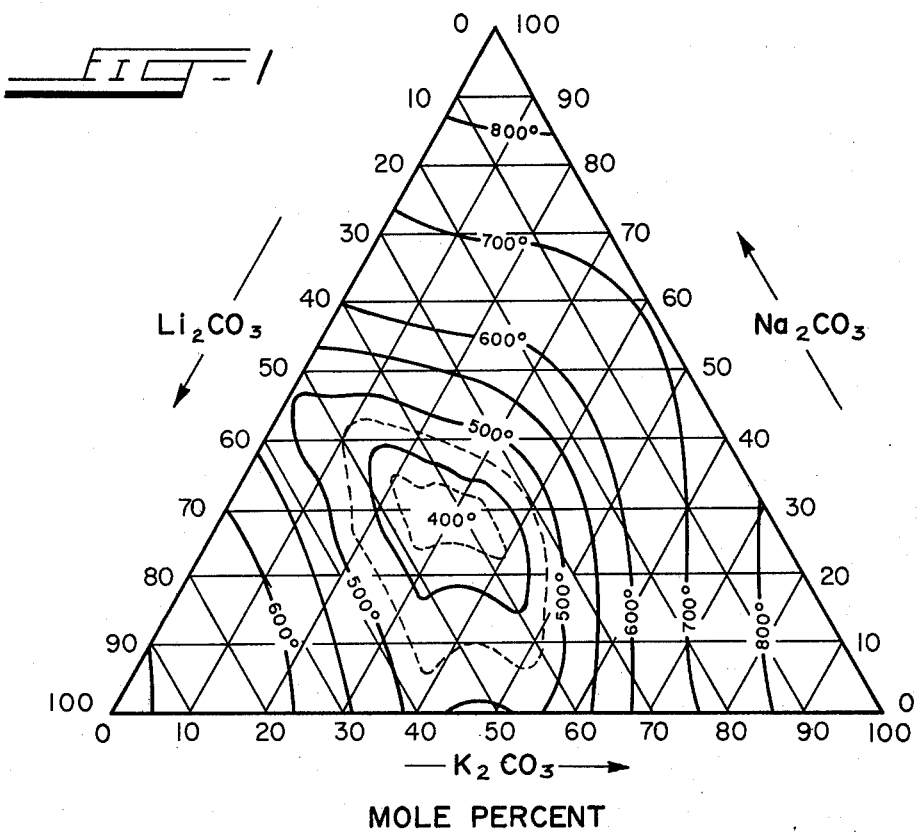
FIG. 1 is a phase diagram for a lithium-sodium-potassium carbonate ternary system.

Our low pressure process for the preparation of beta-lithium aliminate takes place by the reaction of alumina with lithium carbonate in a liquid lithium binary or ternary sodium and/or potassium carbonate composition. It appears that the alpha crystalline form of lithium aluminate is first formed probably by a topotactic nucleation mechanism followed by recrystallization to the beta and/or gamma crystalline forms. It appears that a major driving force for transformation of the alpha crystalline form of lithium aluminate to the beta and gamma crystalline forms is the small particle size of the alpha form. It is preferred for substantially complete transformation within a time of less than 100 hours and at less than about 650° C., that the alpha particle size be from less than about 100 Angstroms to about 800 Angstroms. We have discovered that the desired beta-lithium aluminate may be produced by selecting a lithium binary or ternary sodium and/or potassium carbonate composition which is liquid at the reaction temperatures as shown by the phase diagram in FIG. 1. The desired high conversion to beta-lithium aluminate may be obtained by control of carbonates composition and time and temperature control of reaction conditions.

The reaction is initiated by intimate mixing of finely ground aluminum oxide in the carbonate composition. It is preferable during the first stage of the reaction to heat the mixture of alumina and carbonates at about 480° C. to about 550° C. for about 4 to about 15 hours. The second stage of the reaction is carried out at a higher temperature than the first stage up to about 650° C. with intermittant cooling to ambient and remixing and heating of the reactants. It is preferred that the temperature during the second stage of the reaction be about 630° C. to about 650° C. The first stage of the reaction is carried on for a sufficient time to convert more than 50 percent of the alumina to aluminate and the second stage of the reaction is continued until there is no further loss of $CO_2$ and stabilization of solids weight showing completion of the alumina to alpha-lithium aluminate conversion. We have found that by following the two temperature stage reaction in combination with suitable carbonates compositions, that desired high percentages of beta-lithium aluminate may be obtained.

While the two temperature stage reaction is important to the process of this invention, it must recognized that these stages may be obtained by a gradual rate of heating or maintenance of the reaction mixture at the preferred temperatures.

The crystalline structure of the reactant alumina does not appear to be an important feature in the production of beta-lithium aluminate according to the process of this invention. We have produced lithium aluminate compositions of greater than 50 percent beta form from aluminas having crystalline structures of alpha, gamma, pseudogamma and chiamorphous. Likewise, we have produced according to this invention, high percentages of beta-lithium aluminate from alumina having a primary particle size of from about 45 to 12,000 angstroms. We have found that high yields of beta-lithium aluminate cannot be obtained when the reactant alumina contains more than about 2 to 5 weight percent non-volatile impurities including silica, titanium, iron or sodium oxides. It is preferred that the total non-volatile impurities of the alumina be less than one weight percent and especially preferred that the total non-volatile impurities in the reactant alumina be less than 0.1 weight percent.

The carbonates composition, as pointed out above, must be chosen so as to remain liquid under the reaction temperature conditions. Additionally, the lithium concentration in the carbonate mixture has an effect upon the ratio of beta to gamma crystalline form of aluminate produced. This is illustrated in FIG. 4 in a binary lithium-potassium carbonates mixture. It is seen from FIG. 4 that the beta to gamma ratio increases very rapidly with the desired low weight percentage content of lithium carbonate. It is preferred that the lithium carbonate content of the carbonates reactant mixture be less than about 20 weight percent of the total carbonates mixture. Thus, it is desirable to maintain a low lithium carbonate concentration by gradually adding lithium carbonate to the reaction mixture as the reaction with alumina takes place using up the lithium carbonate reactant.

The sodium to potassium ratio in a ternary carbonates reactant mixture also has an effect upon the beta to gamma ratio of the lithium aluminate product. This effect is illustrated by FIG. 5. It is seen from FIG. 5 that a low sodium and concommitent high potassium carbonate composition of the reactant carbonates mixture is desirable. It is seen from FIG. 5 that the combination of low lithium carbonate and high potassium carbonate in the ternary carbonates mixture very rapidly increases the desired beta to gamma ratio. It is preferred that the potassium carbonate be present in greater than 50 weight percent of the total potassium and sodium carbonates present in the reactant carbonates mixture, above about 75 weight percent being especially preferred. The extent of replacement of sodium carbonate by potassium carbonate in the ternary system is limited by the requirement that the carbonates mixture be liquid over reaction temperatures.

Thus, to obtaiin a beta-lithium aluminate product of highest purity it is desired to have a low lithium and low sodium carbonate composition in the liquid carbonates reactant.

Reference to FIGS. 1, 4 and 5, further illustrate the effects of the carbonates reactant composition.

FIG. 1 is a solid-liquid phase diagram of the ternary carbonate composition of lithium carbonate, sodium carbonate and potassium carbonate. Reference to FIG. 1 shows the limits of the liquid compositions are above about 400° C. where the ternary eutectic freezes. It is also seen from FIG. 1 that the extent of replacement of sodium carbonate by potassium carbonate in the ternary system is limited by the freezing point and the requirement that the reaction take place in the liquid phase. FIG. 1 clearly shows the percentage compositions of the ternary which may be used in the liquid phase at specified temperatures.

FIG. 4 shows the effect of lithium carbonate composition on the beta to gamma lithium aluminate ratio when using a binary lithium-potassium carbonate. This figure is illustrative of the effect of the lithium carbonate content and it must be noted that the beta to gamma ratio of the product is rapidly increasing as the lithium carbonate content decreases. The lithium aluminate reaction product as shown in FIG. 4 was obtained by reaction of alumina powder obtained from Degussa, Incorporated, and identified as their product Degussa C, lot 5613, having the following characteristics, with the lithium-potassium carbonates mixture:

| Alumina Properties Impurities | | Weight Percentage |
| --- | --- | --- |
| $SiO_2$ | | 0.05 |
| $TiO_2$ | | 0.046 |
| $Fe_2O_3$ | | 0.209 |
| $Na_2O$ | | 0.05 |
| Primary Particle Size, A | 58–310 | |
| Bulk Density, gms/ml | 0.042 | |
| Crystal Structure | gamma | |

The carbonates composition used had the composition shown as points on the graph of FIG. 4 after reaction. The mixture was first fired in a furnace under ambient atmosphere to about 525° C. and maintained at that temperature for about 5 hours. The fired mixture was cooled, ground into a fine powder and re-fired at about 640° C. for about 30 hours. The resulting composition of lithium aluminate so obtained was determined by X-ray analysis for the beta and gamma forms as shown in FIG. 4. FIG. 4 shows the desirability of a low lithium carbonate composition in the carbonates mixture to obtain a high beta to gamma ratio of the lithium aluminate product.

FIG. 5 shows the desirability of a high potassium carbonate composition in a ternary lithium-potassium-sodium carbonates composition. FIG. 5 also shows the desirability of a low weight percentage of lithium carbonate in the carbonates composition to obtain a high beta to gamma ratio. The points shown in FIG. 5 represent the final carbonate composition after reaction of Degussa C alumina as described above under the same time and temperature conditions described above with respect to FIG. 4.

The teachings of FIGS. 1, 4 and 5, clearly show the desirability of maintaining a low lithium carbonate concentration in the carbonates composition while maintaining a high potassium carbonate concentration in a ternary carbonates composition, all of which is limited by the freezing point of the compositions as set forth with respect to the ternary in FIG. 1.

Figure 2:
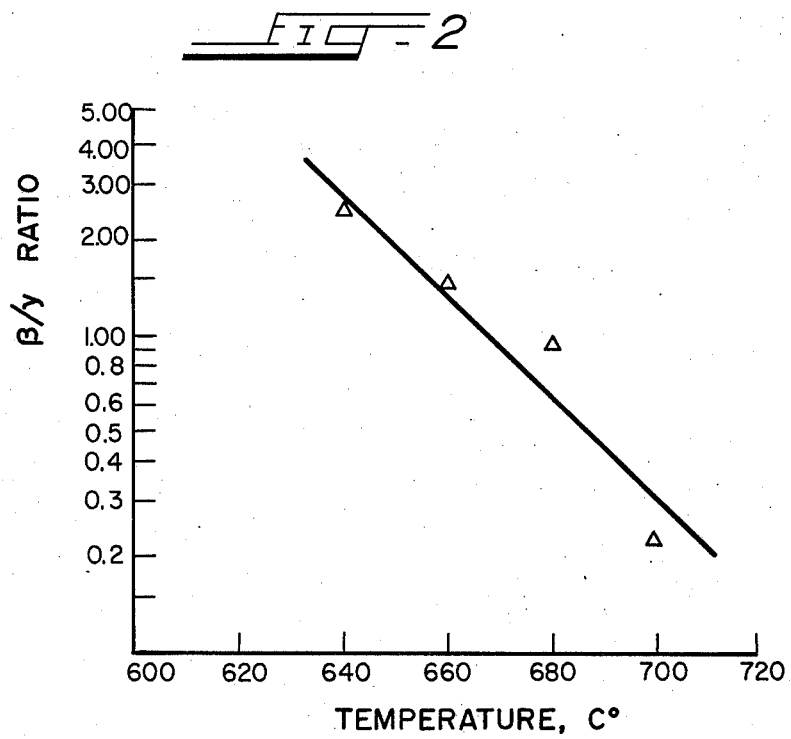
FIG. 2 is a graph showing the effect of temperature on the beta to gamma ratio of produced lithium aluminate.

The effect of temperature and time upon the obtaining of desired high amounts of beta-lithium aluminate in the process of this invention is shown in FIGS. 2 and 3.

FIG. 2 shows the effect of temperature on the beta to gamma ratio obtained by the reaction of a ternary carbonates composition with alumina. Alumina powder denoted as Degussa C as described above, was thoroughly admixed and reacted with a carbonates composition which had the following composition after reaction:

| 8.15 | wt. | percent | $Li_2CO_3$ |
| 51.5 | wt. | percent | $Na_2CO_3$ |
| 40.35 | wt. | percent | $K_2CO_3$ |

The mixture was first fired in a furnace under ambient atmosphere to about 500° C. and maintained at that temperature for about 5 hours. The fired mixture was cooled, ground into a fine powder and re-fired at the temperature specified in FIG. 2 for about 5 hours. The resulting composition shown in FIG. 2 was determined by X-ray analysis for the beta and gamma phases. FIG. 2 shows the desirability of maintaining the second temperature phase of the reaction below about 650° C. It must be recognized that the temperature specified was maintained for only 5 hours and complete conversion of the alpha to beta and gamma forms was not affected.

FIG. 3 shows the transformation of alpha-lithium aluminate to beta and gamma forms of lithium aluminate under various temperature and time conditions. The reaction to aluminates took place using Degussa C alumina as described above with the ternary carbonates composition described above with respect to FIG. 2 which was fired in a furnace under ambient atmospheres to about 525° C. and maintained at that temperature for about 5 hours to assure conversion of all of the alumina present into lithium aluminate. Thus, the solid line shown in FIG. 3 shows the effect of heating the alpha-lithium aluminate for the specified hours at about 640° to 650° C. The dotted line shows the effect of raising the temperature to 685° C. and maintaining it for the indicated times. FIG. 3 shows the importance of time and temperature upon the process of this invention.

The process of our invention for the preparation of beta-lithium aluminate is a low pressure process. By a low pressure process, we mean that the reaction proceeds satisfactorily at ambient pressures, but it may be desirable to utilize pressures up to a few thousand psig. The process may be carried out in ordinary low pressure reaction vessels and the upper limit of desired pressure may be controlled by the equipment used. A significant aspect of this invention is that the reaction proceeds at ambient and relatively low pressures as compared with the extremely high pressures required by prior art methods previously discussed. The process of our invention is particularly suitable for operation at pressures of less than about 500 psig.

The process of this invention is a two thermal stage process wherein the reactants are maintained in a first stage at about 480° to 550° C. for a period of time to react the alumina with lithium carbonate to form lithium aluminate. This time varies dependent upon the temperature used, but about 4 to 15 hours has been found satisfactory. A preferred temperature range for the first thermal stage of this process is about 510° to 540° C. It is usually desired to retain the reactants in the first thermal stage for a period of time sufficient to convert more than 50% of the alumina to the aluminate. The second thermal stage of the process is carried out at about 600° to 650° C. for a time sufficient to transform the lithium aluminate to the desired beta-lithium aluminate. We have found that about 20 to about 100 hours is a suitable time. A preferred range of temperatures for the second thermal stage of the process of this invention is about 630° to 650° C. By the terminology "two thermal stage reaction" we means that the reactants are maintained in a first stage of about 480° to 550° C. and then the temperature is raised to about 600° to 650° C. for a designated time. The temperature may be very slowly and continuously raised from about 480° to 650° C. and we consider this to be within our terminology of a "two thermal stage reaction". Thus, the temperature may be maintained in the lower range for a period of time and then raised to the upper range for a specified period of time or the temperature may be continuously raised at a slow rate.

The following specific Examples are intended to be merely illustrative of our invention and are not meant to contain any limitations.

EXAMPLE I

Alumina powder obtained from Continental Oil Company and identified as their product Conopol having the following characteristics was thoroughly admixed with the below described carbonates mixture:

| Alumina Properties Impurities | | Weight Percentage |
| --- | --- | --- |
| $TiO_2$ | | 0.008 |
| $Fe_2O_3$ | | 0.005 |
| $Na_2O$ | | 0.004 |
| Primary Particle Size, A | 47 | |
| Agglomerate Size, $\mu$m | 0.7 | |
| Bulk Density, gms/ml | 0.45 | |
| Crystal Structure | gamma | |

The carbonates composition used had the following composition after reaction:

| 8.15 | wt. | percent | $Li_2CO_3$ |
| 51.5 | wt. | percent | $Na_2CO_3$ |

| | | | |
|---|---|---|---|
| 40.35 | wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was determined by chemical analysis for the alpha form and X-ray analysis for the beta and gamma forms as follows:

| Crystal Form | Percentage |
|---|---|
| Alpha | 6 |
| Beta | 93 |
| Gamma | 1 |
| Beta/Gamma ratio | 93 |

EXAMPLE II

Alumina powder obtained from Reynolds Metals Company and identified as their product HC-38 having total non-volatile impurities of less than 0.3 percent was thoroughly admixed with the below described carbonates mixture:

| | |
|---|---|
| Agglomerate Size, μm | 0.9 |
| Bulk Density, gms/ml | 0.33 |
| Crystal Structure | chi-amorphous |

The carbonates composition used had the following composition after reaction:

| | | | |
|---|---|---|---|
| 8.15 | wt. | percent | $Li_2CO_3$ |
| 51.5 | wt. | percent | $Na_2CO_3$ |
| 40.35 | wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | Percentage |
|---|---|
| Alpha | 31 |
| Beta | 52 |
| Gamma | 17 |
| Beta/Gamma ratio | 3 |

EXAMPLE III

Alumina powder obtained from Kaiser Aluminum & Chemicals Incorporated and identified as their product XA-300 having total non-volatile impurities of less than 0.2 percent was thoroughly admixed with the below described carbonates mixture:

| | |
|---|---|
| Primary Particle Size, A | 44 |
| Bulk Density, gms/ml | 0.92 |
| Crystal Structure | gamma |

The carbonates composition used had the following composition after reaction

| | | | |
|---|---|---|---|
| 8.15 | wt. | percent | $Li_2CO_3$ |
| 51.5 | wt. | percent | $Na_2CO_3$ |
| 40.35 | wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | Percentage |
|---|---|
| Alpha | 23 |
| Beta | 76 |
| Gamma | 1 |
| Beta/Gamma ratio | 76 |

EXAMPLE IV

Alumina powder obtained by dehydrating J. T. Baker aluminum hydroxide and identified as their product Reagent Grade having the following characteristics was thoroughly admixed with the below described carbonates mixture:

| Alumina Properties Impurities | | Weight Percentage |
|---|---|---|
| $Fe_2O_3$ | | 0.003 |
| Primary Particle Size, A | 96 | |
| Bulk Density, gms/ml | 0.80 | |

| | | | |
|---|---|---|---|
| 8.15 | wt. | percent | $Li_2CO_3$ |
| 51.5 | wt. | percent | $Na_2CO_3$ |
| 40.35 | wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | Percentage |
| --- | --- |
| Alpha | 41 |
| Beta | 58 |
| Gamma | 1 |
| Beta/Gamma ratio 58 | |

EXAMPLE V

Alumina powder obtained from Union Carbide Corporation and identified as their product Linde B having non-volatile impurities of less than 0.02 percent was thoroughly admixed with the below described carbonates mixture:

| Primary Particle Size, A | 500 |
| --- | --- |
| Agglomerate Size, $\mu$m | 0.05 |
| Bulk Density, gms/ml | 0.34 |
| Crystal Structure | pseudo-gamma |

The carbonates composition used had the following composition after reaction:

| 8.15 | wt. | percent | $Li_2CO_3$ |
| --- | --- | --- | --- |
| 51.5 | wt. | percent | $Na_2CO_3$ |
| 40.35 | wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | Percentage |
| --- | --- |
| Alpha | 17 |
| Beta | 76 |
| Gamma | 7 |
| Beta/Gamma ratio 11 | |

EXAMPLE VI

Alumina powder obtained from Union Carbide Corporation and identified as their product Linde A having non-volatile impurities of less than 0.02 percent was thoroughly admixed with the below described carbonates mixture:

| Primary Particle Size, A | 3000 |
| --- | --- |
| Agglomerate Size, $\mu$m | 0.3 |
| Bulk Density, gms/ml | 0.51 |
| Crystal Structure | alpha |

The carbonates composition used had the following composition after reaction:

| 8.15 | wt. | percent | $Li_2CO_3$ |
| --- | --- | --- | --- |
| 51.5 | wt. | percent | $Na_2CO_3$ |
| 40.35 | wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | Percentage |
| --- | --- |
| Alpha | 23* |
| Beta | 76 |
| Gamma | 1 |
| Beta/Gamma ratio 76 | |

*Contained 3 percent HCl-insoluble probably alpha-$Al_2O_3$ but no alpha-$LiAlO_2$ detectable by X-ray.

EXAMPLE VII

Alumina powder obtained from Geoscience Instruments Corporation and identified as their product Microgrit 3 having non-volatile impurities of less than 0.7 percent was thoroughly admixed with the below described carbonates mixture:

| Primary Particle Size, A | 12000 |
| --- | --- |
| Agglomerate Size, $\mu$m | 3 |
| Bulk Density, gms/ml | 1.29 |
| Crystal Structure | alpha |

The carbonates composition used had the following composition after reaction:

| 8.15 | wt. | percent | $Li_2CO_3$ |
| --- | --- | --- | --- |
| 51.5 | wt. | percent | $Na_2CO_3$ |
| 40.35 | wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | Percentage |
| --- | --- |
| Alpha | 8 |
| Beta | 87 |
| Gamma | 5 |
| Beta/Gamma Ratio 17 | |

EXAMPLE VIII

The same alumina powder as described in Example VI was thoroughly admixed with the following carbonates mixture having the following composition after reaction:

| 20 wt. | percent | $Li_2CO_3$ |
|---|---|---|
| 80 wt. | percent | $K_2CO_3$ |

The mixture was first fired in a furnace under ambient atmosphere to about 525° C. and maintained at that temperature for about 5 hours The fired mixture was hours. cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | | Percentage |
|---|---|---|
| Alpha | | 1 |
| Beta | | 91 |
| Gamma | | 8 |
| Beta/Gamma ratio | 12 | |

EXAMPLE IX

The same alumina powder as described in Example V was thoroughly admixed with the following carbonates mixture having the following composition after reaction:

| 20 wt. | percent | $Li_2CO_3$ |
|---|---|---|
| 80 wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | | Percentage |
|---|---|---|
| Alpha | | 24 |
| Beta | | 74 |
| Gamma | | 2 |
| Beta/Gamma ratio | 37 | |

EXAMPLE X

The same alumina powder as described in Example II was thoroughly admixed with the following carbonates mixture having the following composition after reaction:

| 20 wt. | percent | $Li_2CO_3$ |
|---|---|---|
| 80 wt. | percent | $K_2CO_3$ |

The mixture was first fired in a furnace under ambient atmosphere to about 525° C. and maintained at that temperature for about 5 hours. The fired mixture was cooled, ground into a fine powder and re-fired at about 640° C. for 72 hours at which time there was no further loss of carbon dioxide and the mass remained at a stabilized weight indicating that all of the alumina was transformed into aluminate. The resulting composition of the lithium aluminate so obtained was analyzed as in Example I:

| Crystal Form | | Percentage |
|---|---|---|
| Alpha | | 53 |
| Beta | | 42 |
| Gamma | | 5 |
| Beta/Gamma ratio | 8 | |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A low pressure process for the production of beta-lithium aluminate ($LiAlO_2$) in a two thermal stage reaction of alumina with liquid phase lithium carbonate comprising:

admixing powdered alumina with a carbonates composition selected from the group consisting of a ternary lithium-potassium-sodium carbonates composition, a binary lithium-potassium carbonates composition and a binary lithium-sodium carbonates composition, said carbonates composition being liquid at reaction temperatures;

heating said admixture at about 480° to 550° C. in a first thermal stage for a period of time to react the alumina with lithium carbonate to form lithium aluminate;

raising the temperature of said lithium aluminate to about 600° to 650° C. in a second thermal stage for a period of time to transform said lithium aluminate to the desired beta-lithium aluminate.

2. The process of claim 1 wherein the temperature in said first thermal stage is about 510° to 540° C.

3. The process of claim 2 wherein the temperature in said second thermal stage is about 630° to 650° C.

4. The process of claim 1 wherein the temperature of said first thermal stage is maintained for about 4 to 15 hours.

5. The process of claim 1 wherein the temperature of said second thermal stage is maintained for about 20 to 100 hours.

6. The process of claim 1 wherein said alumina contains less than about 2 to 5 wt. percent nonvolatile impurities of silica, titanium, iron and sodium oxides.

7. The process of claim 6 wherein said alumina contains less than 0.1 wt. percent of said impurities.

8. The process of claim 1 wherein said carbonates composition is a ternary lithium-potassium-sodium carbonates composition.

9. The process of claim 8 wherein said potassium carbonate is present in greater than about 50 wt. percent of the total carbonates composition.

10. The process of claim 9 wherein said lithium carbonate is present in less than about 20 wt. percent of said carbonates composition.

11. The process of claim 1 wherein said carbonates composition is a binary lithium-potassium carbonates composition.

12. The process of claim 1 wherein said lithium carbonate is present in less than about 20 wt. percent of the total carbonates composition.

13. The process of claim 1 wherein the said pressure is less than about 500 psig.

14. The process of claim 13 wherein said pressure is about ambient.

* * * * *